(12) United States Patent
Sapp

(10) Patent No.: US 7,165,838 B1
(45) Date of Patent: Jan. 23, 2007

(54) TENSIONING EYEWEAR

(76) Inventor: Leslie Sapp, 79 Pine St., #233, New York, NY (US) 10005

( * ) Notice: Subject to any disclaimer, the term of this patent is extended or adjusted under 35 U.S.C. 154(b) by 0 days.

(21) Appl. No.: 11/439,911

(22) Filed: May 24, 2006

(51) Int. Cl.
*G02C 5/14* (2006.01)

(52) U.S. Cl. .......................... 351/111; 351/41; 351/62; 351/63

(58) Field of Classification Search ............... 351/111, 351/41, 63, 158, 124, 153, 115, 140, 141, 351/62; 2/454; 16/228
See application file for complete search history.

(56) References Cited

U.S. PATENT DOCUMENTS

| 2,761,353 | A |   | 9/1956  | Eustis          |        |
|-----------|---|---|---------|-----------------|--------|
| 3,419,909 | A | * | 1/1969  | Spain ........... | 2/174  |
| 3,713,731 | A |   | 1/1973  | Gardner         |        |
| 5,719,655 | A | * | 2/1998  | Peschel et al. .............. | 351/111 |
| 5,923,384 | A |   | 7/1999  | Enomoto et al.  |        |
| 6,648,471 | B1 | * | 11/2003 | Dalrymple et al. ......... | 351/111 |
| 6,736,503 | B1 |   | 5/2004  | Chen            |        |

\* cited by examiner

*Primary Examiner*—Hung Xuan Dang

(57) ABSTRACT

Tensioning eyewear are disclosed having expandable elastic and padded bands arrange and secured to the frame and truncated temples members to compliment rotation movement of the hinge assemblies wherein the said hinge assemblies provides the rotation movement of frame and temple members and expandable elastic and padded bands members provide the tension. When the eyewear is being worn by the user, the temples members are pivoted outwardly from the frame members and the expandable elastic and padded band members provides a tension force for pivoting the frame and temple members back inwardly. This creates tension in the temples and bridge assemblies and provide tension around the head and face of the wearer and permit the tensioning eyewear to be worn resting about the temples of the wearer and provide a flexible, comfortable and tensioning fit.

7 Claims, 6 Drawing Sheets

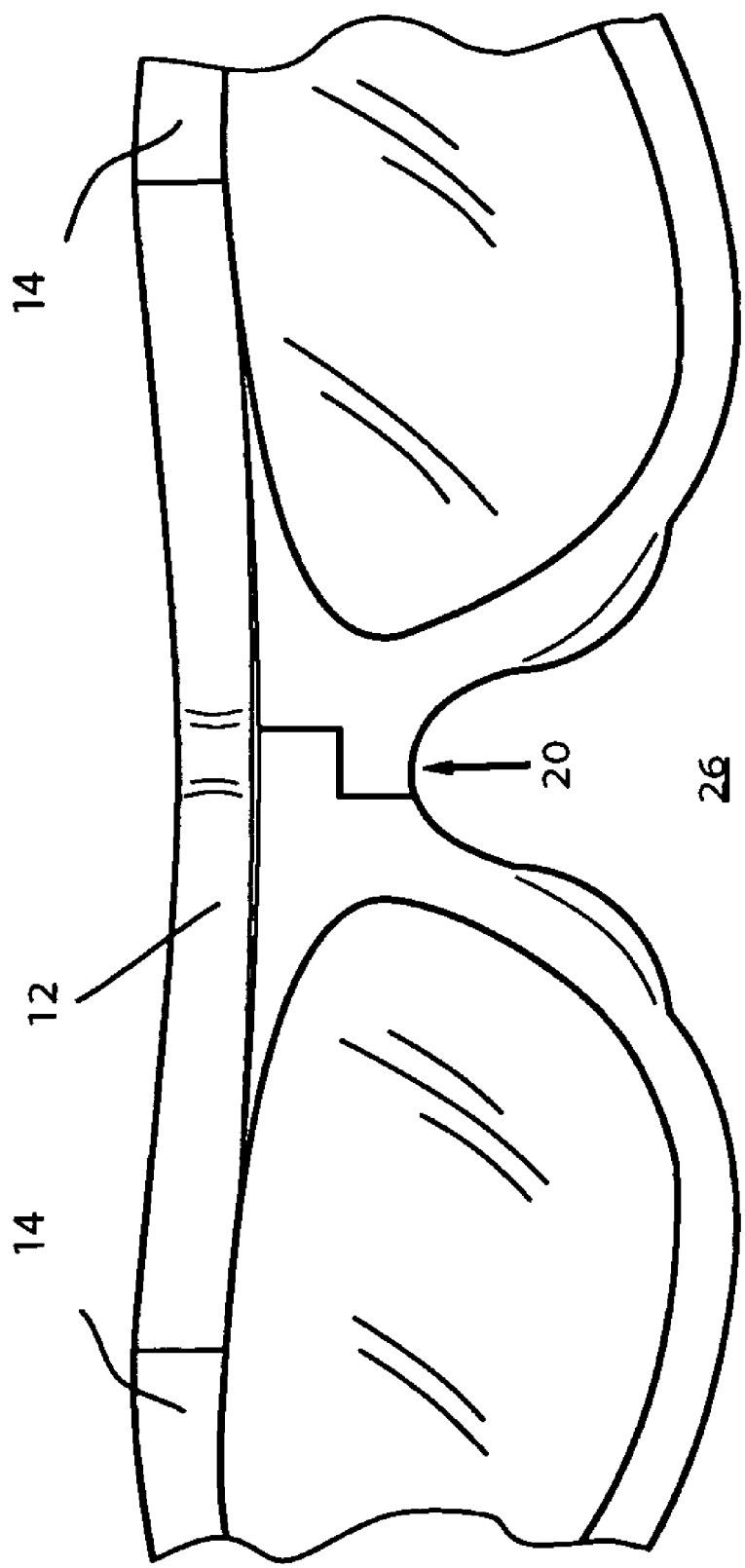

TENSIONING EYEWEAR

CROSS-REFERENCE TO RELATED APPLICATIONS

Non Applicable

STATEMENT REGARDING FEDERALLY SPONSORED RESEARCH OR DEVELOPMENT

Non Applicable

THE NAMES OF THE PARTIES TO A JOINT RESEARCH AGREEMENT

Non Applicable

INCORPORATION-BY-REFERENCE OF MATERIAL SUBMITTED ON A COMPACT DISC

Non Applicable

REFERENCE TO A "MICROFICHE APPENDIX"

Non Applicable

BACKGROUND OF THE INVENTION

1. Field of the Invention

This invention relates to tensioning members for eyewear, which assembly permits the eyewear to provide a tension fit on the face and head of the wearer.

2. Description of the Prior Art

Typical eyeglass frames are comprised of common structures for positioning the frame on the face of the wearer. These structures include temple with ends of which loops behind the ears, and a nose bridge or nose pads attached to the nose bridge. Prior art eyewear utilized means to flexibility to comfortably fit the face of the user incorporating elastic joints at the temple and bridge hinges. In prior art, there has been attempts to design eyewear that provides tensioning and resilient devices. Such prior art devices are exemplified by U.S. Pat. No. 2,761,353 to Eustic entitled Tensioning eyewear for spectacles frames. The invention relates to detachable resilient devices adapted to be arranged at the hinge or pivot portion of the frames of the "horn rim" type frame to yield tension to the frame members where the frame and temples are fashion from plastic material to provide flexibility.

The tensioning devices are attached and detach and mounted on the horn rim type of eyeglasses. U.S. Pat. No. 3,713,731 to Gardner entitled Tensioning Device for Eyeglass Frames also utilized tensioning means for hinged temples. The tensioning means includes a spring members secured to each of the temples. In the prior art references, the eyeglasses comprises flexible components that are attached to joints between the temple and the lens frame. Other eyewear utilizes face conforming eyewear that has a rotation hinged bridge and flexible temples to reduce the inflexibility of the eyewear frame. The wearer of the references eyeglasses must rests the temples on the wearer's ears. Other prior art devices are exemplified by U.S. Pat. No. 6,736,503 to Chen, entitled Elastic joint for eyeglasses. U.S. Pat. No. 3,923,384 to Leblanc entitled Self adjusting spectacle frame assembly, the reference inventions utilized frame and temples structure for eyeglasses having a spring-hinge or elastic hinge joint fixed to the frame and temple members, and these joint are pulled toward each other under the resilient influence, only permitting each temple to move a short distance. However, known eyewear does not contain tensioning members that allow eyewear to expand and provide a tensioning fit without requiring the temple to rests on the wearer's ear.

Therefore, there exists a need in the art for tensioning eyewear which has both expandable elastic and padded bands arrange and secured to the frame and temple members so that such eyewear will provide a flexible, tension, comfortable and secured fit to the wearer face.

BRIEF SUMMARY OF THE INVENTION

This novel invention in the art of eyewear with tensioning members overcomes problems linked to flexible spring and elastic temple hinge assembles or devices, or straps to retain eyewear on the head of the wearer. The user will opt to wear tensioning eyewear because the tensioning effect provides a comfortable and flexible eyewear. Therefore if the eyewear is accidentally pull off the user face during sporting activity, the expandable elastic and padded bands in association with the hinge assemblies will expand, flex and not break easily. The expandable elastic and padded band members are arranged and secured to the frame and temple members so that such eyewear will provide a tensioning, comfortable and secured fit to the wearer face at the temples. The tensioning eyewear according to this invention is different from all conventional eyewear, wherefore the structure is simple and compact. Further, improvement in manufacturing efficiency and reduction in manufacturing cost can also be expected.

BRIEF DESCRIPTION OF THE SEVERAL VIEWS OF THE DRAWING(S)

FIG. 7 is an enlarged, partial rear view of the tensioning eyewear bridge hinge assembly and expandable elastic and padded bands arrange and secured to the frame members.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the claims.

DETAILED DESCRIPTION OF THE INVENTION

Persons skilled in the art will understand that numerous changes and modifications may be pursued without departing from the spirit and scope of the invention defined by the following claims. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed structure or manner.

Figure 1:
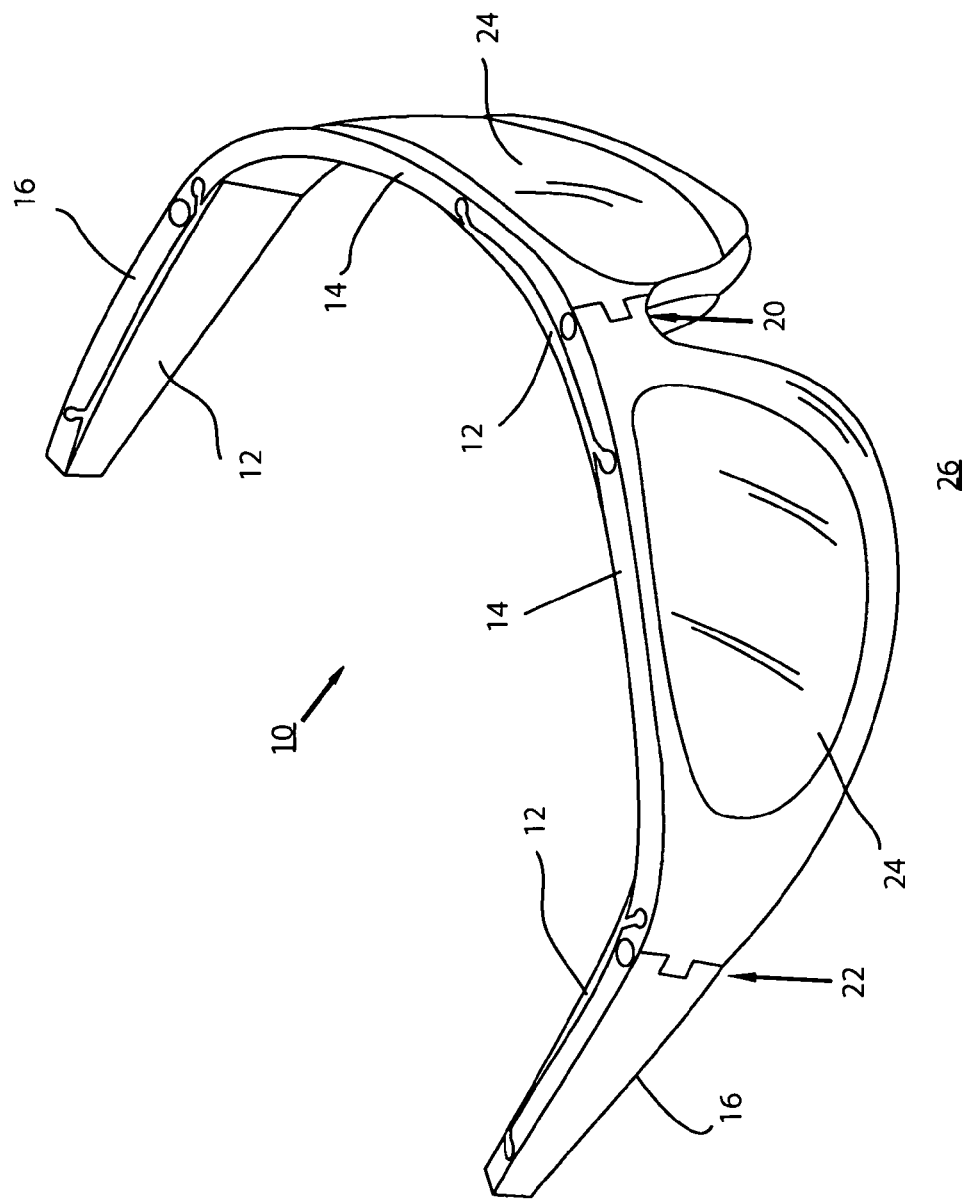
FIG. 1 is a perspective view illustrating tensioning eyewear according the present invention under the expanded open tensioning position.

FIG. 1 is the exemplary embodiment of the tensioning eyewear 26 in an open expanded tensioning position 10. The tensioning eyewear 26 includes a pair of frame members 14, with lens 24. The frame members 14 are joined at the bridge by a bridge hinge assembly 20. The frame members 14 are joined to the truncated temple members 16 by a temple hinge assemblies 22. The expandable elastic and padded band members 12 are attached and secured to the frame 14 and temple 16 members and about the bride 20 and temple 22 hinge assemblies. When the eyewear 26 is worn on the head of the wearer (not shown), the expandable elastic and padded band members 12, will tension about the temples and face and prevent the eyewear 26 from falling or moving away from the face. When the pressure is removed from the temples members 16, the band members 12 will return to a recess tensioning position 30 as shown in FIG. 2.

Figure 2:
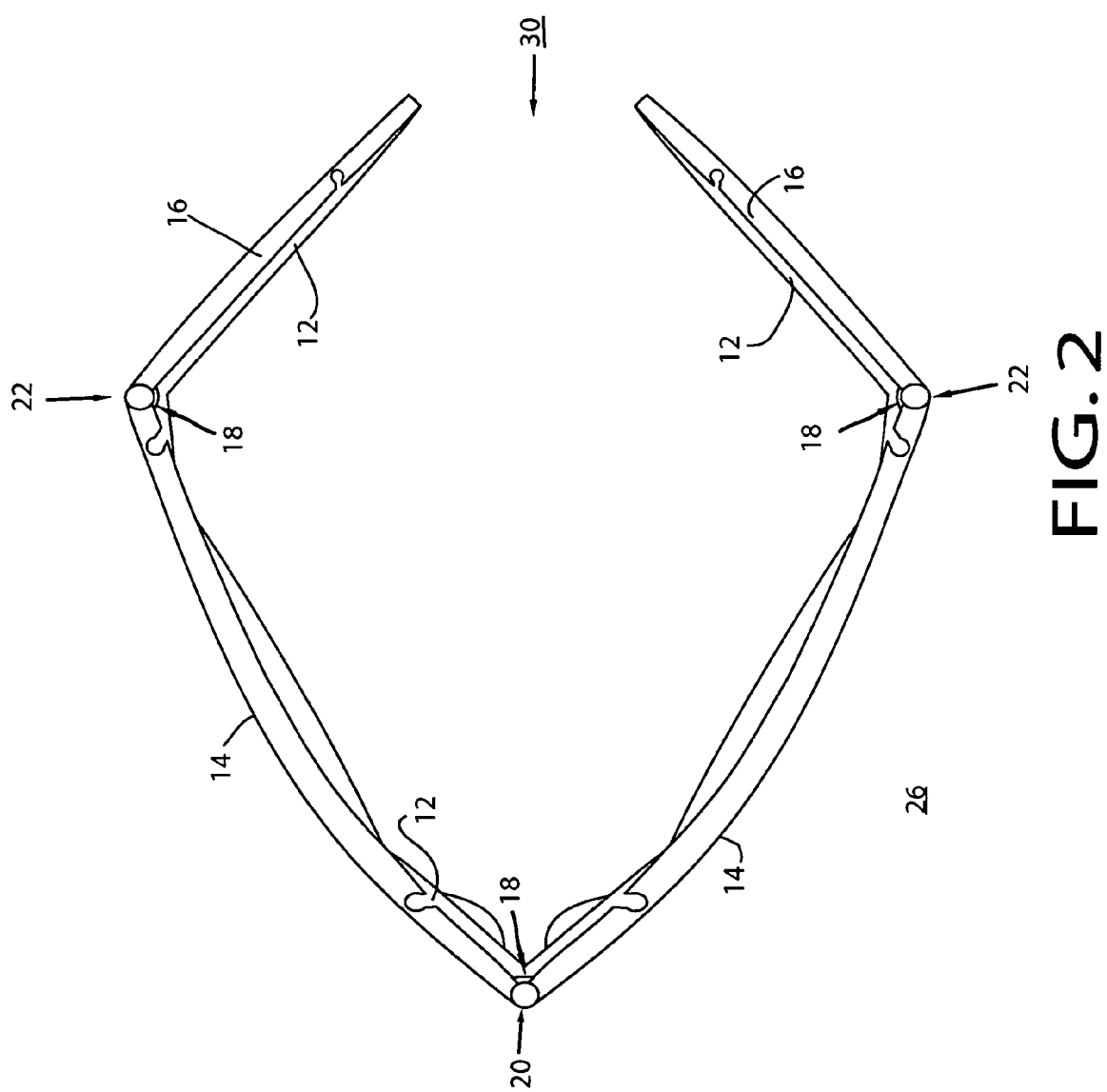
FIG. 2 is a top plan view tensioning eyewear of the present invention in a close recess tensioning position.

FIG. 2 shows the tensioning eyewear 26 in a recess position 30. The expandable elastic and padded bands members 12 are disposed at the bride 20 and temple 22 hinge assemblies in a tension force recess position 30 thus the frame 14 and temple 16 members are in the recess position 30 because of the tensioning inward force of the expandable elastic and padded band members 12. The band members 12 are arrange and secured to the frame 14 and temple 16 members, but are not secured to the bride 20 and temple 22 hinge assemblies. The band gaps 18 provide additional means to allow bride 14 and temple 16 hinge assemblies to rotate easily and the band members will crease at the band gaps 18 to provide sufficient space to act as a means of to increase tension of the eyewear 26. The band members 12 padded thickness will provide adequate cushioning on the wearer's face and offset the fit of the eyewear. When the tensioning eyewear is to be worn by a user, pressure is applied outward on the temples members 16, the distance between the temples members 16 is increased and the bands 12 will cause the frame 14 and temple 16 members to tension toward one another and urge the frame 14 and temple members 16 inward to provide a comfortable tension fit on the face and head of the user.

Figure 3:
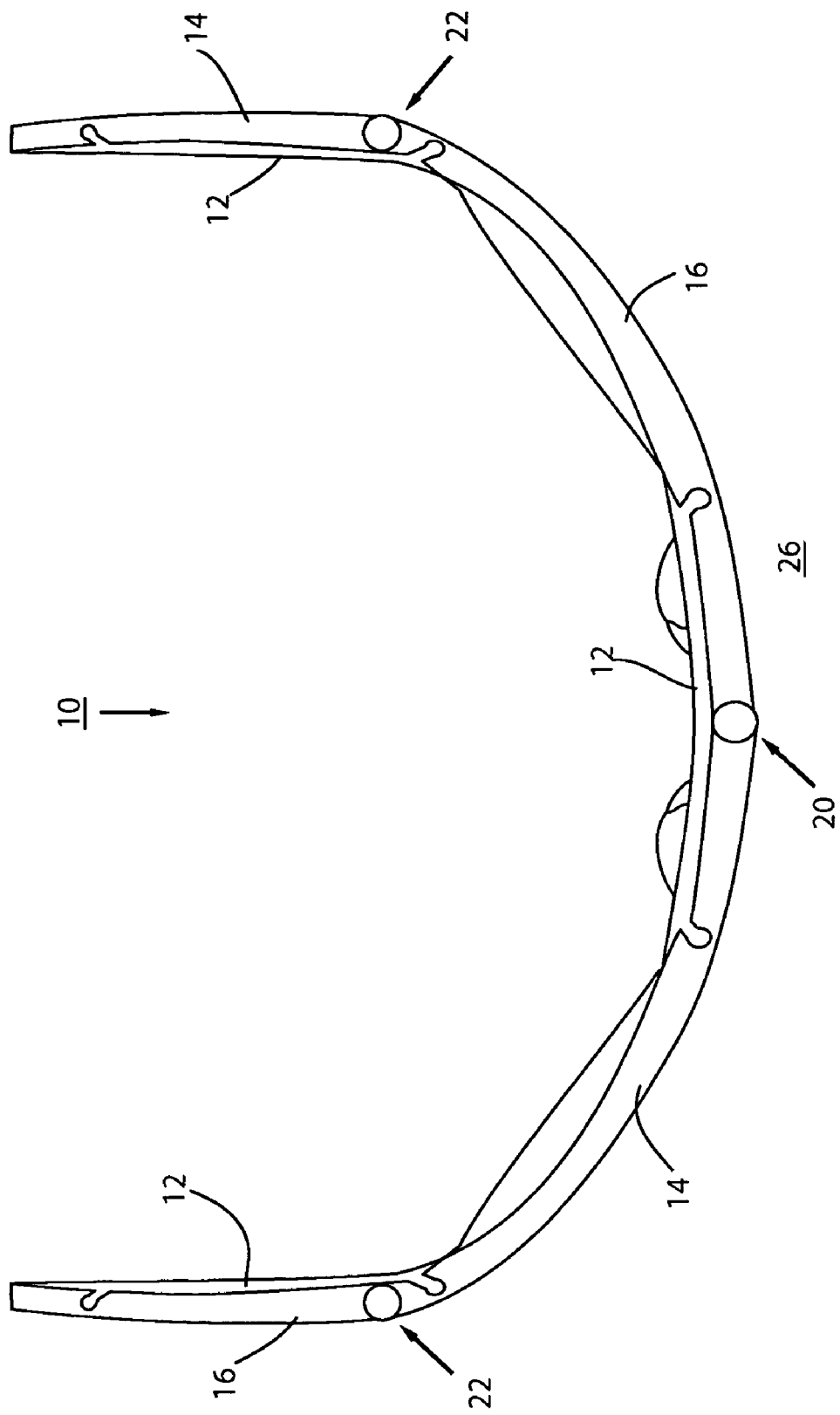
FIG. 3 is a top plan view tensioning eyewear of the present invention, with the frame and temples members in an open expanded tensioning position and ready to be worn.

In FIG. 3 shows the tensioning eyewear 26 in an expanded open tensioning position 10. The expandable elastic and padded band members 12 extend transversely to the inner sides 44 of the frame 14 members and temple members 16 and therefore pass over the bridge 20 and temple 22 hinge assemblies and when the eyewear 26 is worn, the padding prevents any pinching effect of the hinges assemblies. The expandable elastic and padded band members 12 therefore pad the eyewear 26 against the face and head about the temples and make the eyewear 26 more comfortable to wear. Furthermore, since the expandable elastic and padded band members 12 are disposed at the bridge assembly 20 the expandable elastic and padded band members 12 act to stabilize the frame members 14. This helps reduce movement of the frame members 14 in any direction. By providing expandable elastic and padded band members 12, the inward tensioning of the bridge 20 and temple 22 hinge assemblies is distributed across the area of the expandable elastic and padded band members 12. The padded area of expandable elastic and padded band members 12 in contact with the skin makes the overall eyewear 26 comfortable to wear. The friction in between the expandable elastic and padded band members 12 and the skin helps keep the overall eyewear 26 properly oriented on the face.

Figure 4:
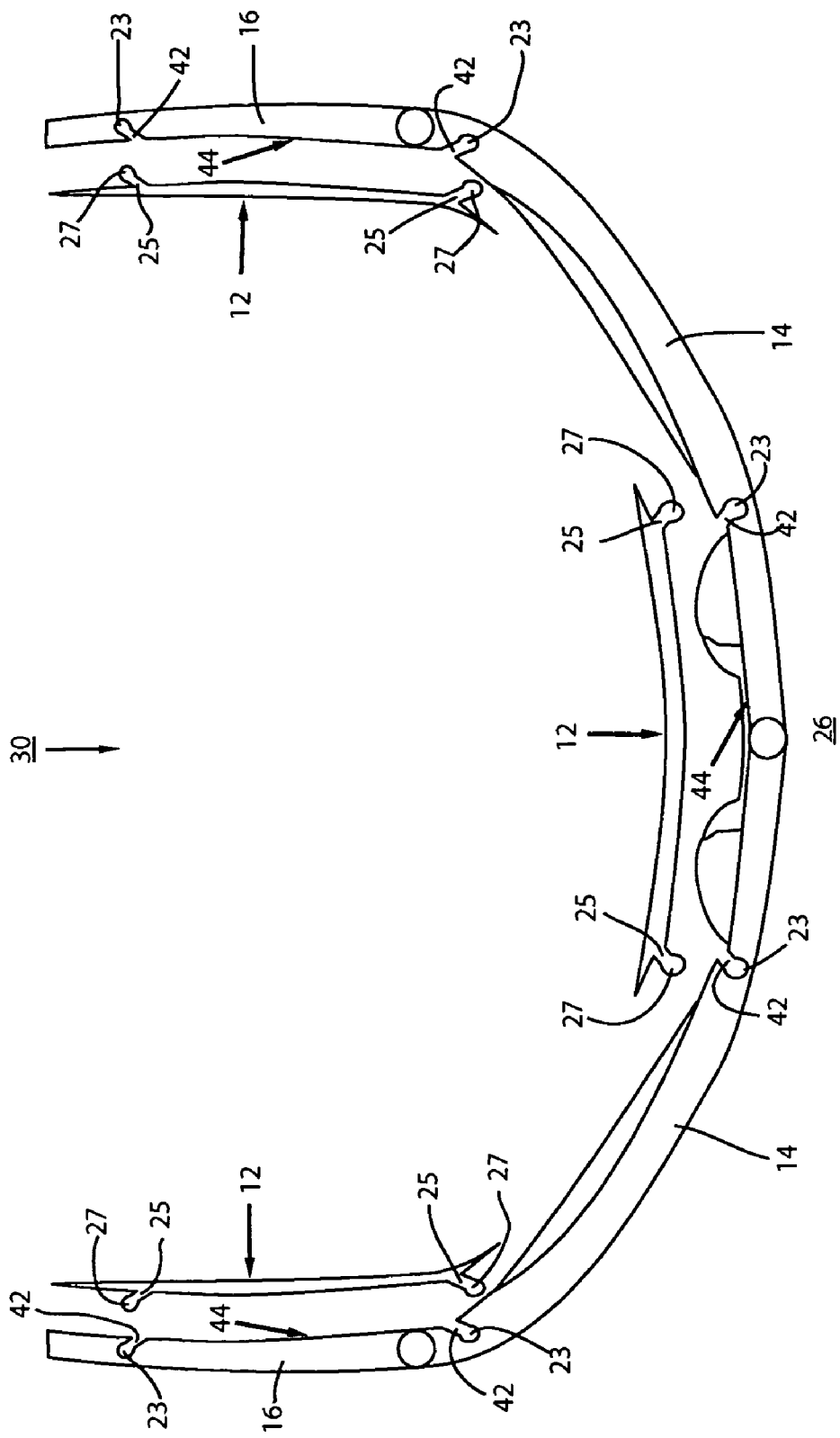
FIG. 4 is a top plan view tensioning eyewear of the present invention, with the expandable elastic and padded band members remove and eyewear in an open expanded tensioning position.

FIG. 4 shows the expandable elastic and padded band members 12 removed from the frame 14 and temple 16 members. The expandable elastic and padded band members 12, neck 25 and head 27 connecting portions are provided as shown. The band members 12 includes male head portions 27 which are adapted to seat in the frame 14 and temple 16 members corresponding c-shape female slit sockets 23. The neck portions 25 are shape so as to fit within longitudinally extending gap grooves 42 of the frame 14 and temple 16 members so that the neck 25 and head 27 portions are slidably received in the frame 14 and temple 16 members where they are locked in place. The expandable elastic and padded band members 12, are adhesively arrange and secured to an inner sides 44 of the frame 14 and temple 16 members.

Figure 6:
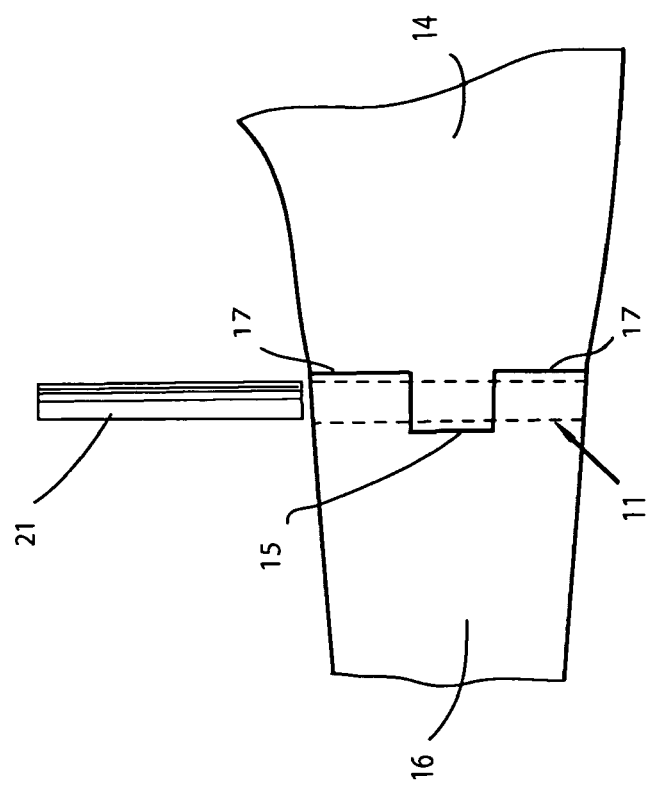
FIG. 6 is an enlarged, elevational partial left side view of the tensioning eyewear temple hinge assembly.
Figure 5:
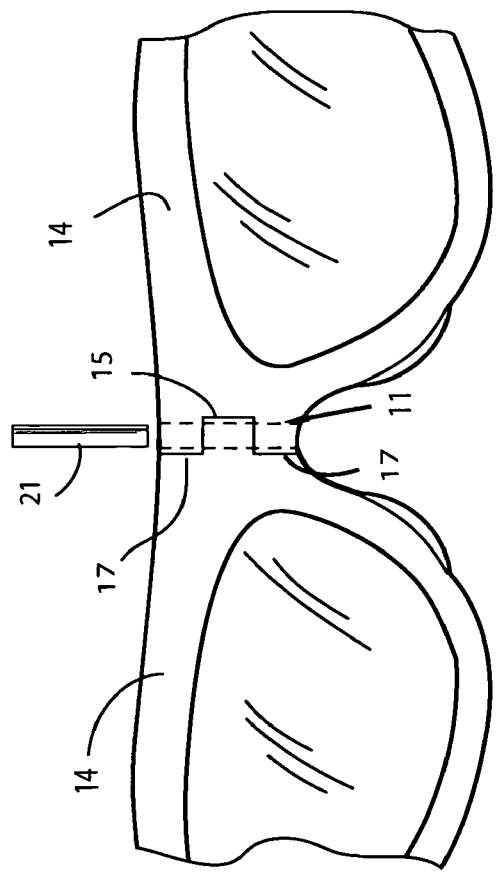
FIG. 5 is a partial front view of the tensioning eyewear bridge hinge assembly.

FIG. 5 shows the frame members 14 joined by a bridge hinge assembly 20 (known art) and FIG. 6 shows the frame members 14 hinge to the truncated temple 16 members by the temple hinge assemblies 22. With reference to FIGS. 5 and 6, in assembly, each hinge illustrates a male tab 15 which extends into the female tabs 17 where it is held by a pin 21. The pin 21 is inserted into aperture 11, and held therein and the frame 14 and temple 16 members are hinged, said pivot being arranged between said male tabs 15 and female corresponding hinge tabs 17 to facilitate a pivotal movement of said members about the pin 21.

FIG. 7 illustrates the rear view of the tensioning eyewear 26 and shows the expandable elastic and padded band members 12 extending transversely of the frame members 14 and over the bride hinge assembly 20.

This disclosure is provided to reveal the preferred embodiment of the invention and it should be apparent that various different modifications can be made without departing from the spirit or scope of the invention. Changes may be made in the material, construction and arrangement of the members of the embodiment as disclosed herein without departing from the as defined in the claims.

SEQUENCE LISTING

Non Applicable

I claim:

1. Tensioning eyewear comprising in combination:
 a pair of truncated temple members which do not hook over the ears and rest at the temples and each having C-shaped female slit sockets and longitudinally extending gaps grooves disposed at a predetermine angle atop said truncated temple members; and
 a pair of frame members each carrying lens and each having c-shaped female slit sockets and longitudinally extending gaps groves disposed at a predetermine angle atop said pair of frame members; and
 a bridge hinge assembly which pivots and connects said pair of frame members at the bridge; and a pair of temple hinge assemblies which pivot and connects said pair of frame members to said pair of truncated temple members; and expandable elastic and padded band members adhesively arrange and secured to the inner sides of the said pair of frame members and said temple members, wherein said band members provide force close tensioning recess position and open expanded tensioning position of the said eyewear; and expandable elastic and padded band members comprising integral connecting portions disposed at the end of the said expandable elastic and padded band members, said connecting portions having neck portions and complimentary enlarged head portions connected at the end of the said neck portions, said neck and head portion are sized and shaped to be slidably received within the said frame and temple members c-shaped female slit sockets and longitudinally extending gaps grooves for forming an interlocked edge-standing relationship with said frame and temple members.

2. Tensioning eyewear according to claim 1, wherein the said expandable elastic and padded band members extends transversely along the inner side of said frame and temple members at the temple and bride hinge assemblies and each having one side adhesively arrange and secured to said frame and temple members thereof, wherein said expandable elastic and padded band members are not adhesively secured to said temple and bridge hinge assemblies.

3. Tensioning eyewear according to claim 2, wherein the said expandable elastic and padded band members urge an inward closed recess tension position of said frame and temples members, wherein said close recess tension position is defined by expandable elastic and padded band members in a recess position.

4. Tensioning eyewear according to claim 2, wherein the said the expandable elastic and padded band members are made of expandable elastic, rubber or the like.

5. Tensioning eyewear according to claim 1, wherein the said bridge and said temple hinge assemblies each in comprise:

a male hinge tab and a corresponding female hinge tab, said female hinge tab being formed by two tabs and said male hinge tab comprising one tab, wherein said male and female tabs having apertures formed therein, wherein a hinge pin adapted to be received in said male and female tabs apertures, said hinge pin disposed in the said apertures to facilitate a pivotal movement of said male and female tabs about said hinge pin, wherein said hinge pin supporting the said bride and temple hinge assemblies for rotational movement about pivot axis between said expanded open tensioning position and said close recess tensioning position of the said eyewear.

6. Tensioning eyewear according to claim 5, wherein said bridge hinge assembly permits said frame members to pivot outwardly between said close recess tensioning and said open expanded tensioning position.

7. Tensioning eyewear according to claim 5, wherein the said temple hinge assemblies enable said frame and said temple members to pivot between said close recess tensioning positions and said open expanded tensioning position.

* * * * *